000

US009716737B2

(12) United States Patent
Subramaniam et al.

(10) Patent No.: US 9,716,737 B2
(45) Date of Patent: Jul. 25, 2017

(54) VIDEO STREAMING IN A WIRELESS COMMUNICATION SYSTEM

(71) Applicant: QUALCOMM Incorporated, San Diego, CA (US)

(72) Inventors: Vijay Naicker Subramaniam, San Diego, CA (US); Fawad Shaukat, San Diego, CA (US); Padam Lal Kafle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 14/144,032

(22) Filed: Dec. 30, 2013

(65) Prior Publication Data

US 2014/0334381 A1  Nov. 13, 2014

Related U.S. Application Data

(60) Provisional application No. 61/821,108, filed on May 8, 2013.

(51) Int. Cl.
| | |
|---|---|
| H04L 29/06 | (2006.01) |
| H04W 4/00 | (2009.01) |
| H04N 21/431 | (2011.01) |
| H04N 21/434 | (2011.01) |
| H04N 21/4363 | (2011.01) |

(52) U.S. Cl.
CPC ....... H04L 65/604 (2013.01); H04N 21/4316 (2013.01); H04N 21/4344 (2013.01); H04N 21/43637 (2013.01); H04W 4/00 (2013.01)

(58) Field of Classification Search
CPC ....... H04L 29/06; H04W 4/00; H04N 21/812; H04N 21/43637

USPC ........ 345/428, 629, 638; 348/42, 43, 51, 54, 348/586; 370/328; 375/240.01, 240.24; 709/214, 228, 240.01, 240.24; 725/116, 725/24, 40, 81

See application file for complete search history.

(56) References Cited

U.S. PATENT DOCUMENTS

| | | | |
|---|---|---|---|
| 2007/0285439 A1* | 12/2007 | King | G09G 5/397 345/638 |
| 2008/0170622 A1 | 7/2008 | Gordon et al. | |
| 2009/0019492 A1 | 1/2009 | Grasset | |
| 2011/0096699 A1 | 4/2011 | Sakhamuri et al. | |

(Continued)

FOREIGN PATENT DOCUMENTS

| | | |
|---|---|---|
| WO | WO-9619077 A1 | 6/1996 |
| WO | WO-2012007876 A1 | 1/2012 |

OTHER PUBLICATIONS

International Search Report and Written Opinion—PCT/US2014/034299—ISAEPO—Jul. 9, 2014.

(Continued)

*Primary Examiner* — Charles C Jiang
*Assistant Examiner* — Wali Butt
(74) *Attorney, Agent, or Firm* — Knobbe, Martens, Olson & Bear, LLP

(57) ABSTRACT

Wireless communication devices are provided with direct video and audio streaming capability. The streaming capability may support overlays, and seek functionality. Some implementations include incorporation of these features into devices with a mirroring display mode such as Miracast.

36 Claims, 9 Drawing Sheets

(56) References Cited

U.S. PATENT DOCUMENTS

| | | | |
|---|---|---|---|
| 2011/0145879 A1* | 6/2011 | Rajamani | G06F 3/1454 |
| | | | 725/116 |
| 2011/0149173 A1 | 6/2011 | Jang et al. | |
| 2011/0268425 A1* | 11/2011 | Glen | H04N 5/63 |
| | | | 386/272 |
| 2012/0178380 A1 | 7/2012 | Fleck et al. | |
| 2013/0050254 A1* | 2/2013 | Tran | G06F 3/14 |
| | | | 345/629 |
| 2013/0148740 A1 | 6/2013 | Samanta | |
| 2013/0148947 A1* | 6/2013 | Glen | H04N 5/917 |
| | | | 386/355 |
| 2013/0162911 A1* | 6/2013 | Glen | H04N 21/234327 |
| | | | 348/586 |
| 2013/0219072 A1* | 8/2013 | Han | H04L 65/60 |
| | | | 709/228 |
| 2014/0281014 A1* | 9/2014 | Good | H04N 19/40 |
| | | | 709/231 |

OTHER PUBLICATIONS

Wi-Fi Alliance, "Wi-Fi Display Technical Specification Version 1.0.0", Wi-Fi Alliance Specification, Aug. 24, 2012 (Aug. 24, 2012), pp. 149, Chapters 4.5, 4.6, 4.8, 4.11, 6; XP009172467.
Taiwan Search Report—TW103114402—TIPO—Apr. 18, 2016.

\* cited by examiner

VIDEO STREAMING IN A WIRELESS COMMUNICATION SYSTEM

CLAIM OF PRIORITY UNDER 35 U.S.C. §119

The present application for patent claims priority to Provisional Application No. 61/821,108 entitled "VIDEO STREAMING IN A WIRELESS COMMUNICATION SYSTEM" filed May 8, 2013, and assigned to the assignee hereof. Provisional Application No. 61/821,108 is hereby expressly incorporated by reference herein.

BACKGROUND

Recent advances have been made to allow direct streaming of video and audio directly from one wireless communication enabled device to another. One such system is known as "Miracast." Miracast is a trademark for a wireless (e.g. IEEE 802.11 family of wireless protocols or "Wi-Fi") display protocol promulgated by the Wi-Fi Alliance. As used herein, the term Miracast refers to the current form of the Wi-Fi Alliance's display sharing protocol, also known as Wi-Fi Display (WFD). The Miracast specification is designed for streaming any type of video bitstream from a source device to a sink device. As one example, a source may be a smart phone, and a sink may be a television set. Although in typical IEEE 802.11 wireless networks, client devices communicate through an access point (AP) device, protocols exist (such as Wi-Fi Direct) that support direct device communications. The Miracast system uses such protocols for sending display data from one device to another, such as from a smart phone to a television or computer, or vice-versa. The Miracast system involves sharing the contents of a frame buffer and speaker audio of the source device to a remote display/speaker device (sink) over a Wi-Fi connection.

The Miracast protocol involves the source capturing the RGB data from the frame buffer and any PCM (Pulse Coded Modulation) audio data from the audio subsystem. The content of the frame buffer may be derived from application programs or a media player running on the source. The source then compresses the video and audio content, and transmits the data to the sink device. On receiving the bitstream, the sink decodes and renders it on its local display and speakers.

When a user plays an audio/video clip locally on a Miracast capable source device, the bitstream is decoded and rendered locally on the source display and then the audio/video content is captured, re-encoded and streamed to a Miracast capable sink device at the same time. The sink device then decodes and renders the same content on its display and speakers. Such operation is often called the "mirroring" mode.

SUMMARY

In one implementation, a method of displaying display content that is wirelessly received from a source device without passing through an intermediary device is presented. The method includes wirelessly receiving a first set of display data packets for a first overlay portion of an image frame encoded utilizing a first video compression format directly from the source device. The method includes wirelessly receiving a second set of display data packets for a second overlay portion of the image frame encoded utilizing a second video compression format directly from the source device. The method includes wirelessly receiving overlay blending information directly from the source device. The method includes extracting the first overlay portion of the image frame from the first set of display data packets and the second overlay portion of the image frame from the second set of display data packets. The method includes blending the first overlay portion and the second overlay portion for display based at least in part on the overlay blending information received from the source device.

In another implementation, a method of wirelessly transmitting display content to a sink device without passing the display content through an intermediary device is presented. The method includes encoding a first set of display data packets for a first overlay portion of an image frame utilizing a first video compression format. The method includes encoding a second set of display data packets for a second overlay portion of the image frame utilizing a second video compression format. The method includes generating overlay blending information associated with the first overlay portion and the second overlay portion. The method includes wirelessly transmitting the first set of display data packets, the second set of display data packets, and the overlay blending information directly to the sink device.

In another implementation a display data sink device is presented. The device includes a display, a plurality of video decoders, and processing circuitry. The processing circuitry is configured to wirelessly receive a first set of display data packets for a first overlay portion of an image frame encoded utilizing a first video compression format directly from a source device. The processing circuitry is configured to wirelessly receive a second set of display data packets for a second overlay portion of the image frame encoded utilizing a second video compression format directly from the source device. The processing circuitry is configured to wirelessly receive overlay blending information from the source device. The processing circuitry is configured to extract the first overlay portion of the image frame from the first set of display data packets and the second overlay portion of the image frame from the second set of display data packets. The processing circuitry is configured to blend the first overlay portion and the second overlay portion for display based at least in part on the overlay blending information received from the source device. The processing circuitry is configured to present the image frame on the display.

In another implementation a display data source device is presented. The device includes a display, a plurality of video decoders, at least one media player program and processing circuitry. The processing circuitry is configured to encode a first set of display data packets for a first overlay portion of an image frame utilizing a first video compression format. The processing circuitry is configured to encode a second set of display data packets for a second overlay portion of the image frame utilizing a second video compression format. The processing circuitry is configured to generate overlay blending information associated with the first overlay portion and the second overlay portion. The processing circuitry is configured to wirelessly transmit the first set of display data packets, the second set of display data packets, and the overlay blending information directly to a sink device.

In another implementation, a system for wirelessly transmitting display data from a source device to a sink device without passing the display data through an intermediary device is presented. The system includes a source device having a display and wireless transmission and receiving circuitry. The system includes a sink device having a display and wireless transmission and receiving circuitry. The source device and the sink device are configured to negotiate display transmission and receiving parameters to allow a first mode and a second mode. In the first mode display data is retrieved from a display frame buffer of the source device, encoded for wireless transmission, wirelessly transmitted to the sink device, decoded on the sink device, and presented on the display of the sink device. In the second mode at least a first overlay portion of an image frame is encoded utilizing a first video compression format and a second overlay portion of the image frame is encoded utilizing a second video compression format at the source device. In the second mode the first overlay portion and the second overlay portion are wirelessly transmitted to the sink device, separately decoded on the sink device, blended on the sink device based at least in part on overlay blending information received from the source device, and presented on the display of the sink device.

DETAILED DESCRIPTION

Figure 1:
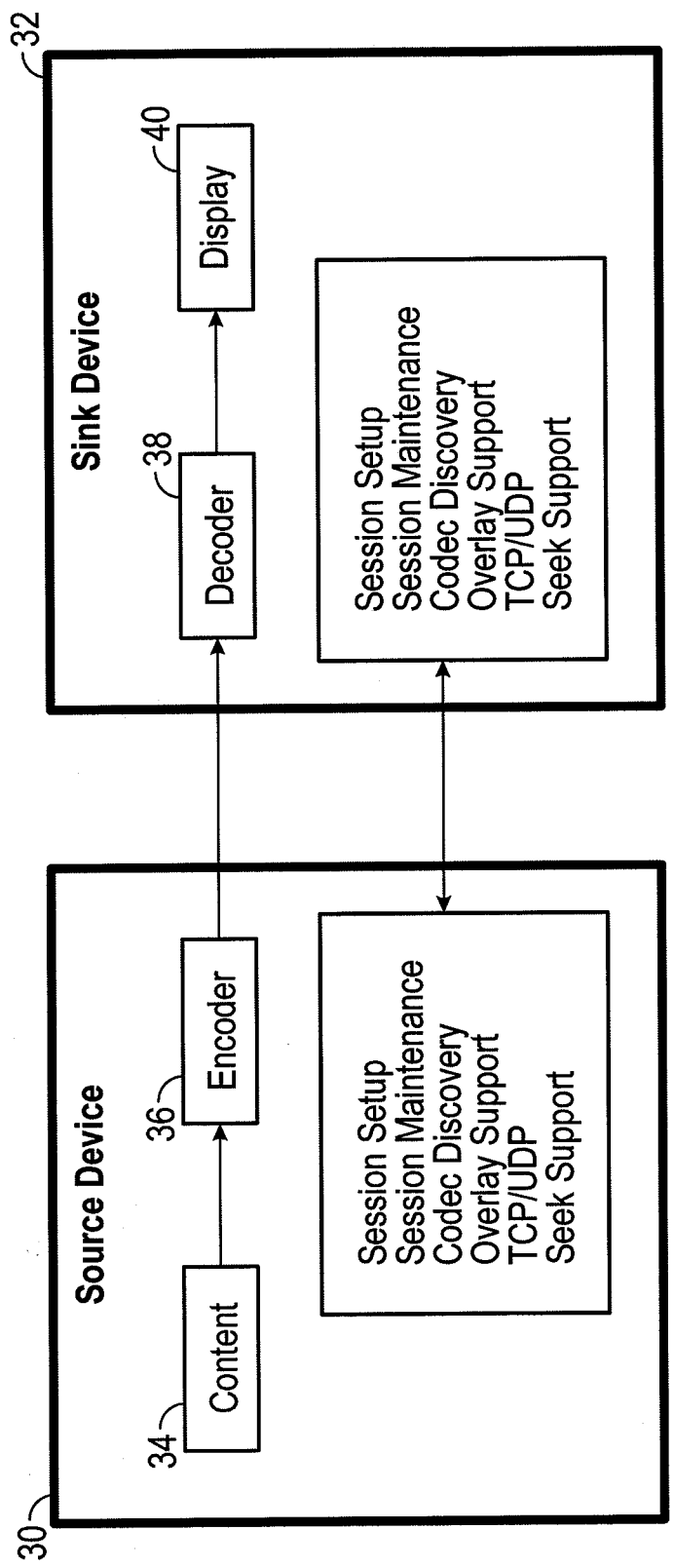
FIG. 1 is a block diagram of source and sink devices in one implementation of an extended Miracast video streaming system supporting direct streaming.

Various aspects of the novel systems, apparatuses, and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The present disclosure is directed to systems and methods that allow a first device, referred to herein as a source, to deliver video content to a second device, referred to herein as a sink, for display on the second device. In some implementations, each device is capable of communicating wirelessly according to one or more of the IEEE 802.11 family of wireless communication protocols. Although such devices typically communicate through an access point (AP) rather than directly, protocols have been developed that allow source devices to transmit video to sink devices directly, without using any AP or other intermediary. As described above, one such protocol is known as Miracast or Wi-Fi Display. The implementations described below use the currently existing Miracast protocol as a starting point, with its commonly used mirroring mode. Enhancements and extensions of this protocol are set forth below. These enhancements and extensions have application not just to Miracast, but also to any display sharing device or protocol, system, or method allowing transmission, reception, and presentation of display data on and between devices connected wirelessly in a local environment, where "local" refers generally to the range of a wireless LAN connection, such as within a room, building, and the like.

If a video clip is played on a source device in a Miracast type system, Miracast with its basic mode (mirroring) requires capturing the video output after it is decoded and then requires re-encoding it with an H.264 codec before streaming it to the sink device. Such operation, often referred as transcoding, causes the device to consume more power as the video clip is first using a video decoder to decode the clip, and then the decoded video clip gets re-encoded before being streamed to the sink device.

The transcoding of the video may also potentially degrade the video quality especially when the encoded bitrate is lower than the native bitrate of the video clip. This is may occur because the current Miracast implementations require re-encoding using only the constrained base or constrained high profiles of H.264 codec, whereas video content is often available in other formats.

To overcome these limitations, wireless communication enabled devices can be supplemented to additionally support direct streaming capability, which allows streaming of audio/video content without the need of transcoding. This allows power reduction through streaming of bit-streams, and higher quality by obviating the transcoding.

Figure 2:
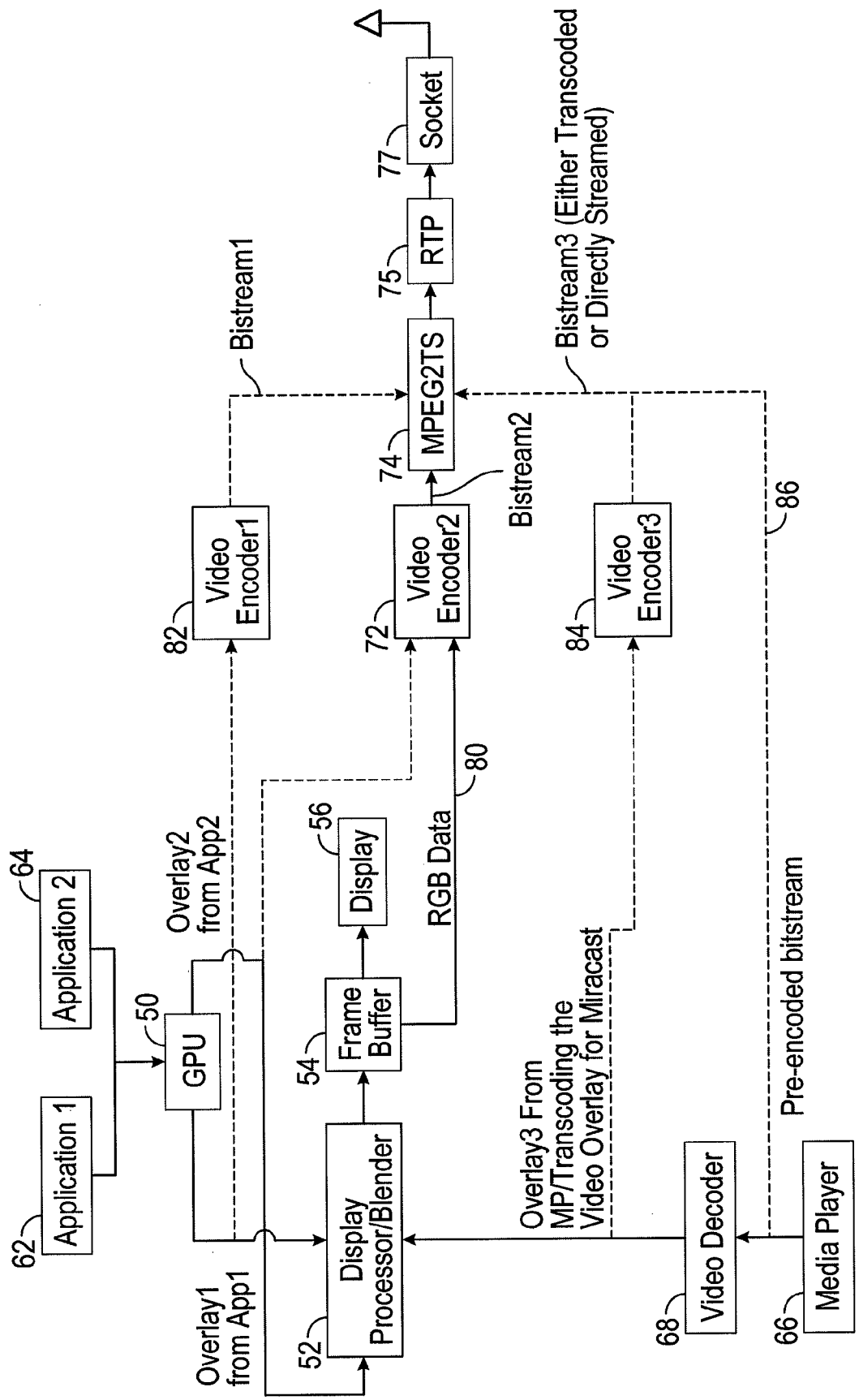
FIG. 2 is a block diagram of a source device in one implementation of an extended Miracast video streaming system of FIG. 1.
Figure 3:
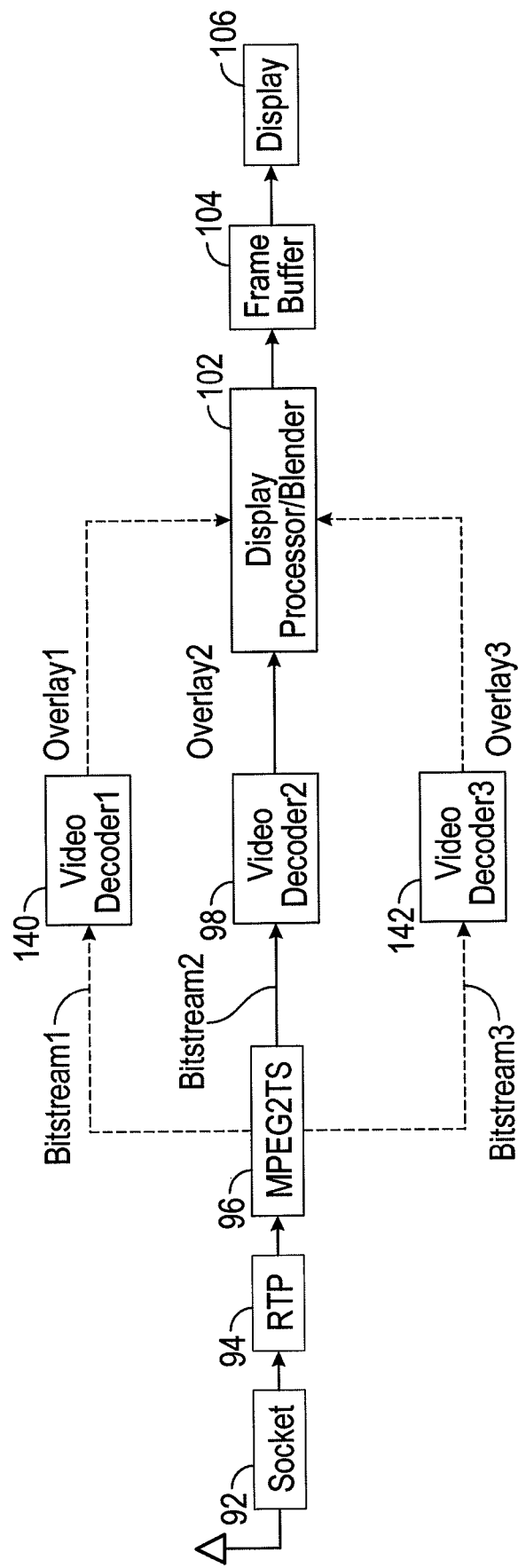
FIG. 3 is a block diagram of a sink device in one implementation of an extended Miracast video streaming system of FIG. 1.

Referring now to FIGS. 1 through 3, in an extended Miracast system, additional control communications and transfer protocol negotiations can occur between a source device 30 and a sink device 32. As shown in FIG. 1, at the source 30, display data 34 is routed to an encoder 36. In conventional Miracast systems, the only supported encoder 36 and decoder 38 are H.264 protocols. This data is then transmitted wirelessly to the sink 32, using an MPEG2 transport stream with Real Time Transport Protocol (RTSP) messaging in conventional Miracast systems. When received at the sink 32, the data is routed to a corresponding decoder 38 and sent to a display 40 on the sink 32. Control signals are also passed between the source 30 and sink 32. In the conventional Miracast system, control signals for session setup and session maintenance are utilized. In the system of FIGS. 1 through 3, one or more additional control communications may occur between the source 30 and sink 32. In one implementation, during capability negotiation, the source 30 queries the sink 32 for direct streaming to see if the sink supports the feature itself. It also queries for various codecs and profiles for audio and video that the sink 32 supports and the TCP (Transmission Control Protocol) or UDP (User Datagram Protocol) port number that the sink 32 wants the source to direct stream content to. The sink 32 may respond back with the list of audio/video codecs and profiles and the TCP or UDP port number if it supports direct streaming during a Miracast session. After streaming of one video clip, another video clip may be switched into the direct streaming data path. This allows the use of a variety of encoders 36 and decoders 38, with advantages described further below. As will be described further below, support for handling overlays and sink side seek functionality can also be provided.

Referring now to FIG. 2, a block diagram of one implementation of a source device 30 of FIG. 1 is illustrated. In FIG. 2, the source device includes a Graphics Processing Unit (GPU) 50, a Display Processor/Blender 52, a frame buffer 54, and a display 56. The source may be running several applications such as Application 1 62 and Application 2 64 which may provide display data for presentation to a user. Under the control of the source operating system, the GPU 50 and the Display Processor/Blender 52 prepare the display data and fill the frame buffer 54, for forwarding to the display 56. The source may also include a media player 66 which also routes content to the Display Processor/Blender 52 through a video decoder.

Data flow in a conventional stand-alone display mode and in a conventional Miracast mirroring mode is illustrated by the solid arrows of FIG. 2. When Miracast mirroring is being performed, the successive frames of pixel data in the frame buffer 54 are routed to a video encoder 72 along data path 80, the encoded data is assembled into an MPEG2 transport stream by module 74, combined with RTP messaging data by module 75, and routed to a socket 77 for transmission to the sink device 32. In conventional Miracast, the encoder 72 is an H.264 encoder and the socket is a UDP socket, with no other options supported.

A sink device 32 is illustrated in FIG. 3. In the sink, a socket 92 receives the incoming data stream, RTP messaging is extracted with module 94, and display data is extracted with module 96. As with FIG. 2, conventional Miracast data flow is illustrated with solid arrows. The display data may be routed to a video decoder 98, then to a Display Processor/Blender 102, which fills a frame buffer 104 for presentation on the display 106. In conventional Miracast, the video decoder 98 is an H.264 decoder, which is required in any sink device compatible with the Miracast standard.

It can be seen that in the conventional Miracast system, because pixel data is retrieved from the frame buffer for transmission to the sink 32, no information is available regarding what types of display information is being loaded into the frame buffer 54. It could be text from an application program 62 and 64, or a movie from the media player 66, or a combination of the two. In many cases, this information can be useful in optimizing sink display quality and minimizing power drain of the source device.

To enhance the performance and capabilities of a conventional Miracast display system, additional video encoders 82 and 84 can be supported by the system, and additional data paths illustrated in broken arrows can be provided.

In one implementation, a direct streaming path 86 containing the pre-encoded bit stream from the media player 66 can itself be assembled without transcoding into an MPEG2 transport stream by module 74, instead of using the frame buffer input at data path 80. This avoids first performing a decoding by the video decoder 68 and subsequent H.264 re-encoding by video encoder 72 prior to transport stream assembly. This saves power at the source 30. At the sink device 32, the data is decoded with a decoder that corresponds to the original pre-encoded format of the display data output from the media player 66, which may not be H.264 format. In this implementation, any encoding format is suitable, as long as the sink device has a compatible decoder, as determined by the source device during the query process described above. With reference to FIGS. 2 and 3 for example, in this implementation, the only limitation on the video decoder 98 is that it be capable of decoding the original pre-encoded bit stream from path 86 of FIG. 2.

At least two options for direct streaming may be utilized, RTSP based messaging and MPEG2-TS based messaging.

Figure 4:
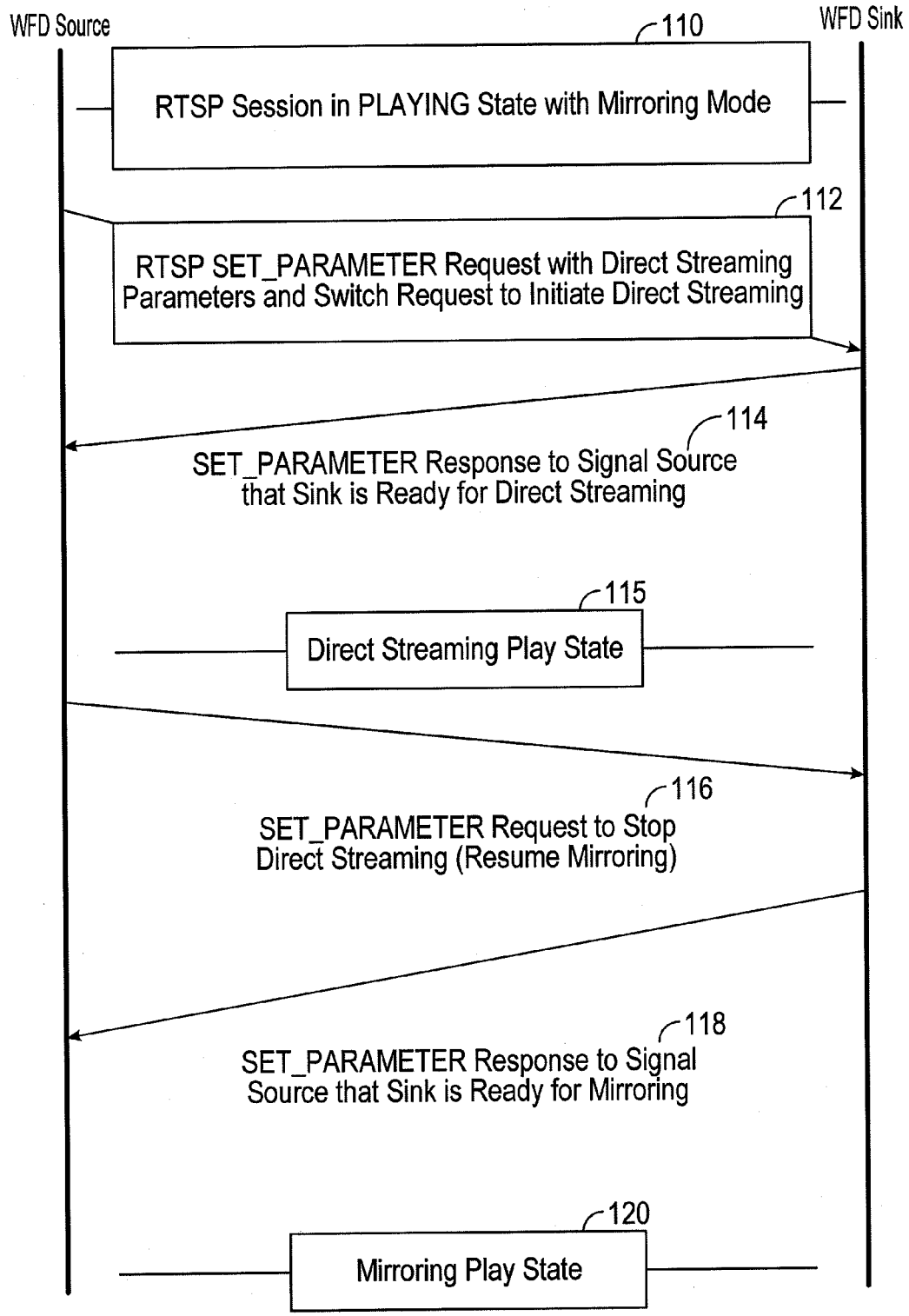
FIG. 4 is a sequence diagram illustrating one implementation of a message sequence for switching from mirroring to direct streaming.
Figure 5:
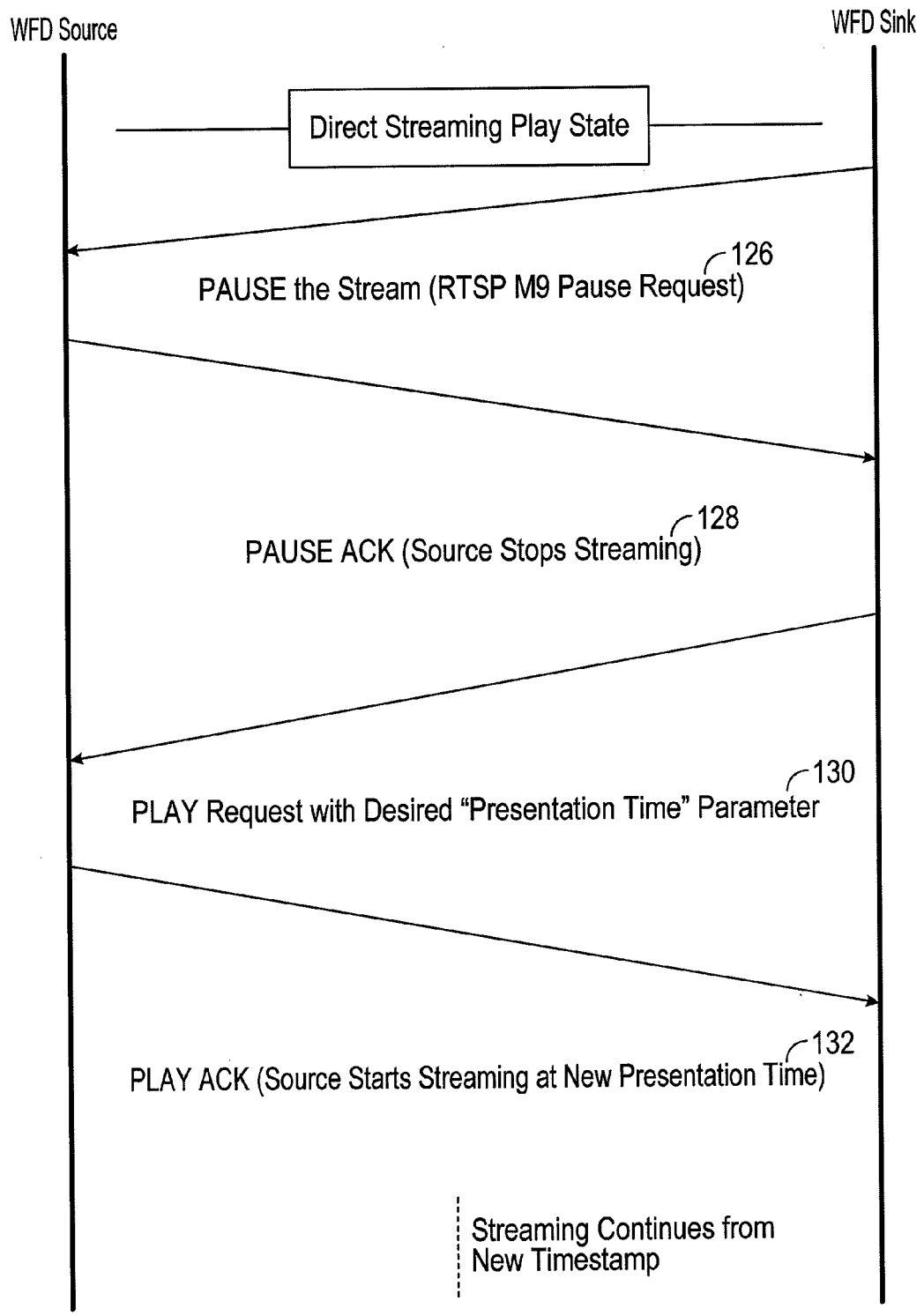
FIG. 5 is a sequence diagram illustrating one implementation of a message sequence for sink side seek functionality.

RTSP based messaging is illustrated in FIG. 4. The system may begin in a display mirroring mode as in the conventional Miracast protocol at state 110 where the image data is taken from the frame buffer of the source, and is H.264 encoded at the source and H.264 decoded at the sink (e.g. utilizing the solid lines of FIGS. 2 and 3 as described above). This mode requires transcoding of the display data as also described above. If a user of the source device 30 selects to play a video clip stored on, generated by, or received by the source in an encoding format for which the sink 32 includes a compatible codec, the source 30 device may send an RTSP request message at 112 to indicate that a stream switch from mirroring to direct streaming will start. When the sink receives this request, at 114 it responds to the source to change the bitstream from mirroring to direct streaming and prepares its decoder for receiving the new bitstream on the TCP/UDP port that was negotiated, and informs the source that it is ready for direct streaming. The source on receiving the response from sink stops the mirroring bitstream and starts streaming the bitstream contained in the video clip to the TCP/UDP port negotiated for this purpose, entering the direct streaming mode at block 115. If the user stops the clip or the clip reaches the end of the stream, at 116 the source sends an RTSP request to indicate that the direct streaming is ending, i.e., the stream switch from direct streaming to mirroring will start. When the sink receives this request, at 118 it responds to the source to change the bitstream from direct streaming to mirroring mode and prepares its decoder for receiving the mirroring bitstream on the default Miracast port setup for the Miracast session. Upon receiving the response from the sink, the source enters the mirroring mode at 120 and starts streaming the mirroring bitstream to the default Miracast port.

In another possible implementation, MPEG2 TS based messaging may be used when using a UDP transport port. For example, if a user of the source device selects to play a video clip whose codec and profiles are supported by the sink, the source device changes the Program Association Table (PAT) and Program Map Table (PMT) such that it uses a different active Program number for transporting the new bitstream for Direct Streaming. When the sink receives a new PAT and PMT, it stops playing the mirroring bitstream and prepares its decoder for receiving the new bitstream that continues to be received on the same UDP port that was used during mirroring. The source, after sending updated PAT and PMT, starts streaming the bitstream contained in the video clip to the same UDP port as the mirroring bitstream. If the user stops the clip or the clip reaches the end of the stream, the source changes the PAT and PMT back to that of the mirroring Program Number as the active Program. When the sink receives an updated PAT and PMT, it stops playing the direct streaming bitstream and prepares its decoder for receiving the mirroring bitstream that continues to be received on the same UDP port.

In the above described implementations, the source may determine that the current compression format of the video content is compatible with an existing codec on the sink device, and may send the video content in the original format, thereby avoiding the transcoding process performed by the conventional Miracast system. In some implementations, the channel state (or other information) may indicate that a different compression format may advantageously be used. Because the source knows the codecs on the sink, it may choose a different compression format to use that is compatible with a different sink codec. This may involve transcoding the original video content, but may improve video quality on the sink device depending on the channel state.

During direct streaming of video content, seek functions can be flexibly supported. Seek functionality does not currently exist in Miracast due to the fact that a live session is being streamed using the content of the display frame buffer on the source device. Moving back and forth in time while in mirroring is not practical. However, during direct streaming, there may be a desire to rewind and forward a media clip that is being streamed from the source to the sink.

For example, when a source initiates a seek trigger based on user input at the source, it can send a RTSP SET_PARAMETER trigger method set to Pause or Play action along with the desired "Presentation Time" value. After this, the sink may send back the Response for the Trigger Request, and the source may subsequently initiate a new Play Request message when it is ready to stream from the new time.

An example of a sink side seek request is provided in FIG. 3. In this example, when a sink initiates a seek, it can send an M9 Request for Pause at 126, and the source, at 128, may stop streaming and send a stream stop acknowledgement to the sink. At 130, the sink may send a Play Request along with the desired "Presentation Time" value to the source corresponding to the time in the video clip the user of the sink selects as a new start point for video playback. At 132, the source begins streaming from the new sink selected presentation time.

Currently, an ability to send overlay content along with video from the source to sink is not supported in the current Miracast specification, which streams video content using only single format. Without overlay capability, only a full-screen mode of video-playback is possible. The full screen in the frame buffer of the source is encoded with the same video encoder regardless of the nature of the content in different parts of the display. In some implementations, an extended system can flexibly enable multiple overlays, and provide flexible overlay operations performed on the sink side.

Referring back to FIGS. 2 and 3, intelligent overlay support may be provided using separate encoding processes with encoders 72, 82, and 84 of FIG. 2 for different overlay components of each image frame. The encoded data for each overlay may be assembled into a single MPEG2 transport stream by module 74. The encoders 72, 82, and 84 may be of the same or different format. When using encoding of different formats for different overlays, it is possible to achieve optimum performance, such as a lossless codec for graphics and UI and a lossy codec for video and other content for which lossy compression artifacts are not easily visible. Also, support for overlays allows sending only the incremental changes in frame buffer content for graphics, reducing the bandwidth requirement for high-resolution content display. Such an extension for Miracast can flexibly support multiple overlays, in which, the overlay content can be streamed to the sink device, and displayed over a desired region of interest in the sink display.

On the sink 32 side, illustrated in FIG. 3, data in different portions of the MPEG2 transport stream can be extracted and routed to separate decoders 98, 140, and/or 142 that can decode the data streams separately according to the respective encoding methods performed on the source 30. The overlay data is then blended on the sink side by the Display Processor/Blender 102 according to control information that may be sent with the MPEG2TS/RTP stream (as described further below) for populating the frame buffer 104 and presentation on the sink display 106.

A desire to simultaneously transmit one or more overlay content(s) arises in many gaming and other usage of Wi-Fi display when higher visual quality is necessary for displaying certain graphics or UI control information at desired locations of a display together with a regular video display. The overlay display content may use raw RGB or other loss-less compression methods.

Additional messaging and protocol extension may be added into the Miracast protocol to support streaming overlay(s) with the video data. During the direct streaming negotiation, the source and sink devices can exchange parameters to negotiate if the sink can support overlays, and what methods of blending the overlay content with the combined frame composition can be supported. Methods to multiplex and demultiplex the compressed or uncompressed RGB overlay frames into MPEG2TS can be provided, and the video format supported for the overlay(s) e.g. RGB or Chroma formats or any specific codec format can be determined and negotiated.

For RTSP messaging, the source may negotiate with the sink for support of video codecs, and capability information on whether the overlay is supported and how many overlays are supported. The source may set parameter to choose codec types for the background frame and one for the overlays. In some implementations, a maximum of two codec types may be allowed. For example the background can be encoded in JPEG and video overlay(s) can be encoded in H.264. Or both background and the overlays may be encoded in H.264. The source may also set a parameter for the maximum number of overlays to be sent.

Figure 6:
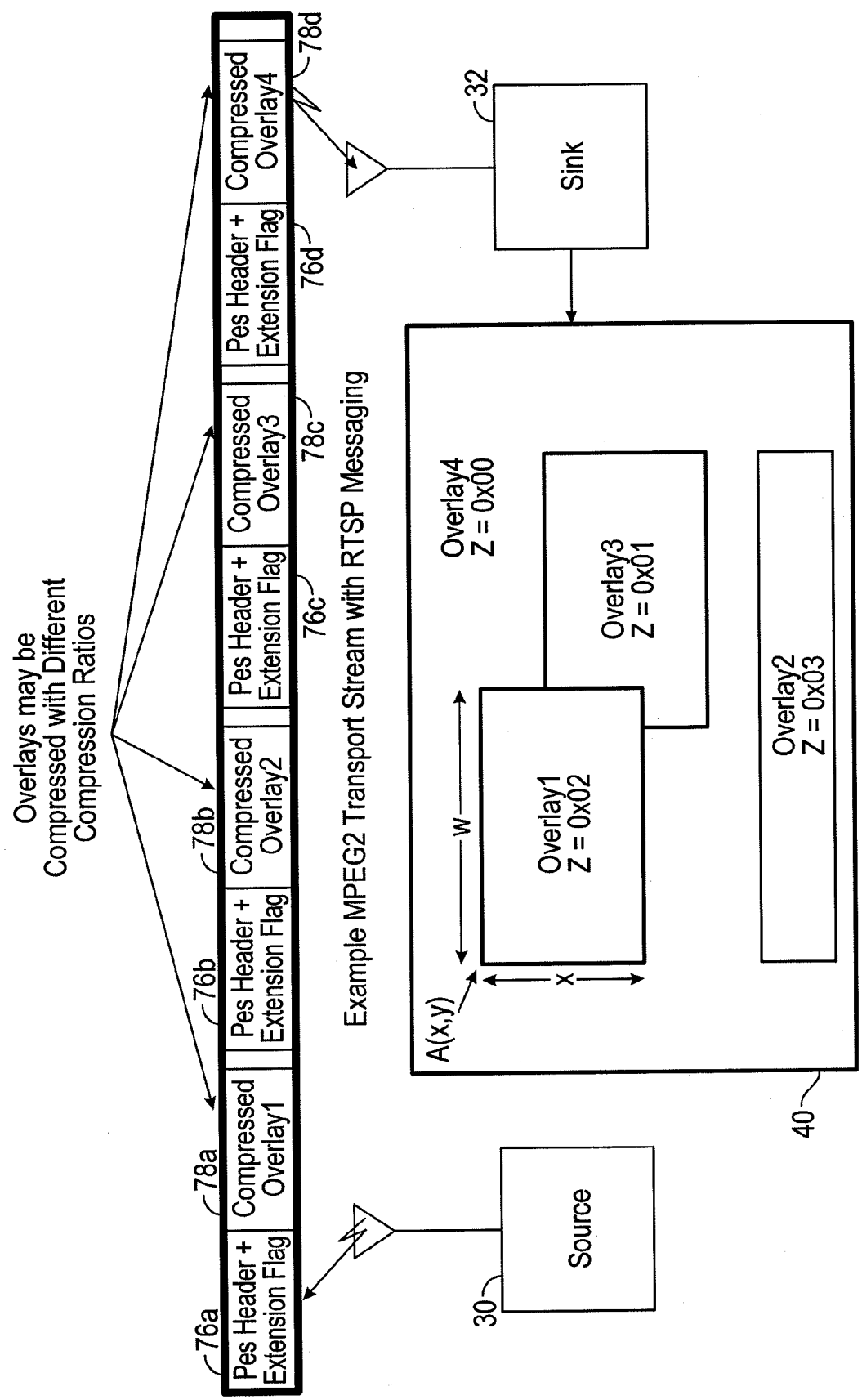
FIG. 6 illustrates one implementation of a transport stream in an extended Miracast video streaming system supporting overlay processing in the sink device.

FIG. 6 illustrates an example using MPEG2TS signaling. In this example, each overlay may be preceded by properties describing the overlay in a Packetized Elementary Stream (PES) header (designated 76a, 76b, 76c, and 76d). Each header is followed by a corresponding overlay data packet 78a, 78b, 78c, and 78d. The PES header format in the MPEG2 transport stream is very flexible, allowing the creation of private data fields in the headers that can be used for system specific information transfer. The overlay properties included in the PES header may include top left coordinate (x,y) to mark the location of the overlay relative to the background. The coordinates may be in pixel locations with A=2 bytes for x and 2 bytes for y. For width and height of the overlay, W=2 bytes for width and H=2 bytes for height. The order in which the overlay is to be blended to the background may also be provided, where a lower number indicates that the overlay should be blended first with Z=1 byte. 0x00 indicates background layer, and a value for Alpha may be provided where Alpha=1 byte. A 3 byte CK value for Color key may be provided.

Figure 7:
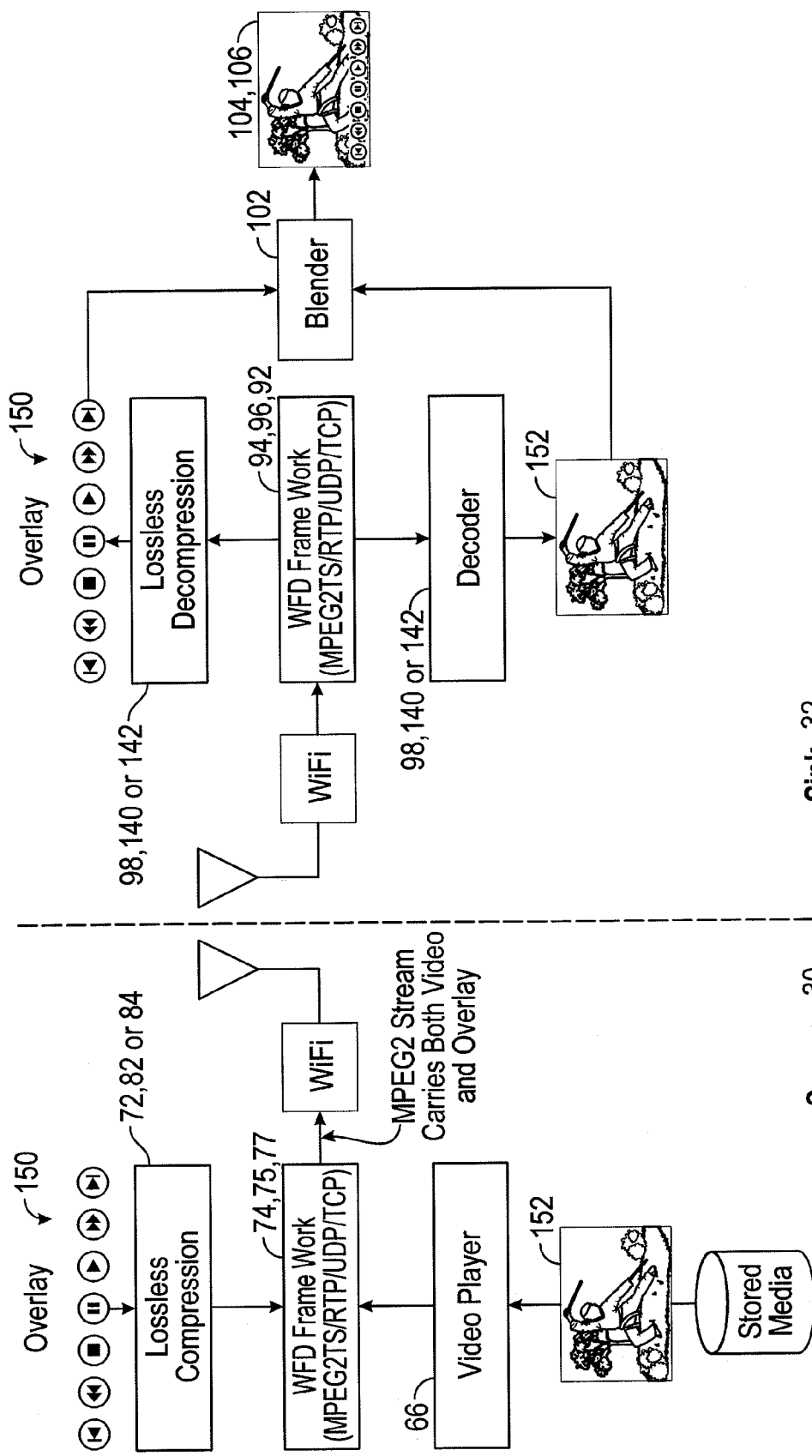
FIG. 7 is a block diagram of one implementation of an extended Miracast video streaming system supporting overlay processing in the sink device.

FIG. 7 illustrates a specific overlay streaming example. In this example, a foreground overlay 150 is combined with a background video stream 152. The overlay 150 may be generated by the video player 66, a different application program 62 or 64 on the source 30, or the operating system of the source 30. FIG. 7 illustrates an example where the video data is streamed in its pre-encoded state without transcoding. The overlay is encoded with a different lossless compression encoding. On the sink 32 side, the MPEG2TS/RTP stream is unpacked, and the two data sets are decoded separately for blending at module 102 according to the overlay information provided in the MPEG2TS/RTP stream.

A blend equation may be applied at the sink side between the composited background layer and the foreground (overlay). For example:

Blended pixel=Alpha*$Pixel_{FG}$+(1−Alpha)*$Pixel_{BG}$

Figure 8:
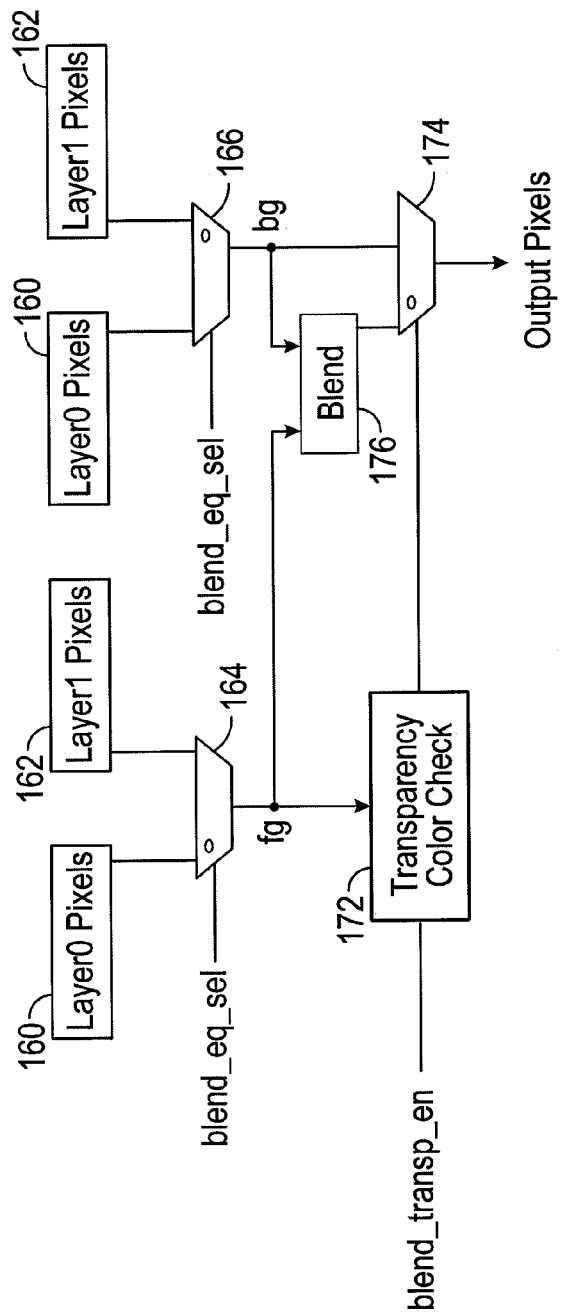
FIG. 8 is a block diagram of one implementation of a blending module in a sink device of an extended Miracast video streaming system supporting overlay processing in the sink device.

Final pixel=Foreground pixel if transparency check using color key passes else Final pixel=Blended pixel This algorithm is implemented by the functional block diagram of FIG. 8. In this Figure, pixels of an overlay Layer0 160 are processed with corresponding pixels of a different overlay Layer1 162. A selection signal blend_eq_sel determines which overlay is foreground, and which is background using multiplexers 164 and 166. Another control signal blend_transp_en determines whether a transparency color check is performed at block 172. If the transparency color check passes, the background pixel is output from multiplexer 174, otherwise, a blended pixel from block 176 is output from multiplexer 174 to the frame buffer 104 of the sink 32 for display at that pixel location. The parameters for the blend equation implemented in block 176 and the status of the control signals may be controlled by the information sent from the source 30 on the MPEG2 transport stream.

For example, the sink device may wait to receive the background layer which is marked by Z=0x00 and the overlay count to match total overlay (negotiated at startup) before the blend operation begins. The background layer may be larger than the overlays in width and height and match the negotiated sink's display resolution. If there were no succeeding overlays received after receiving Z=0x00 and a presentation timeout time has been exceeded, then the overlay process may be terminated and the frame can be shipped out to the display for rendering. The presentation timeout time may be based on the received frame rate. For example, if the frame rate of the display data being received is 30 fps, the presentation time out may be about 33 msec.

During a Miracast session, any number of overlays might start at any instant of time as far as they do not exceed the maximum number of overlays that were negotiated at startup. Each overlay may have its own elementary stream based on the negotiated codec i.e. JPEG, H.264. A Program Map Table (PMT) for the MPEG2 transport stream may be updated each time there is an elementary stream added or removed from the program that carries an overlay. If a new elementary stream is added, then successive MPEG2 transport packets may contain PES packets for the new elementary stream. Each elementary stream may carry certain details of the overlay, so the blender on the sink can compose the final frame to be rendered. A new PES_extension_flag may be used to indicate the presence of overlay information in the PES. A new field may be added in the PES packet to carry overlay information in PES including the coordinates, width, height, Z order, alpha value, color key and blending equation. This information may be passed to the display processor on the sink for generating the final frame to be rendered.

As described above, in some implementations, an extension of the Miracast protocol can negotiate mutual capabilities including the supported codec parameters and/or the option of the sink creating a TCP port for use during direct streaming. Another extension of Miracast can support switching of bitstreams during playback using RTSP based and MPEG2-TS based approaches depending upon the latency vs. roubustness requirements (e.g. if to use TCP or UDP). An extension of Miracast can support seek functionality while using direct streaming mode. An extension of the Miracast protocol can support multiple overlays being sent over the Miracast session and the sink may render the combined frame composition using the pre-negotiated video formats and blending modes including overlay signaling over RTSP, overlay blending techniques, and PES information for overlay transport.

Figure 9:
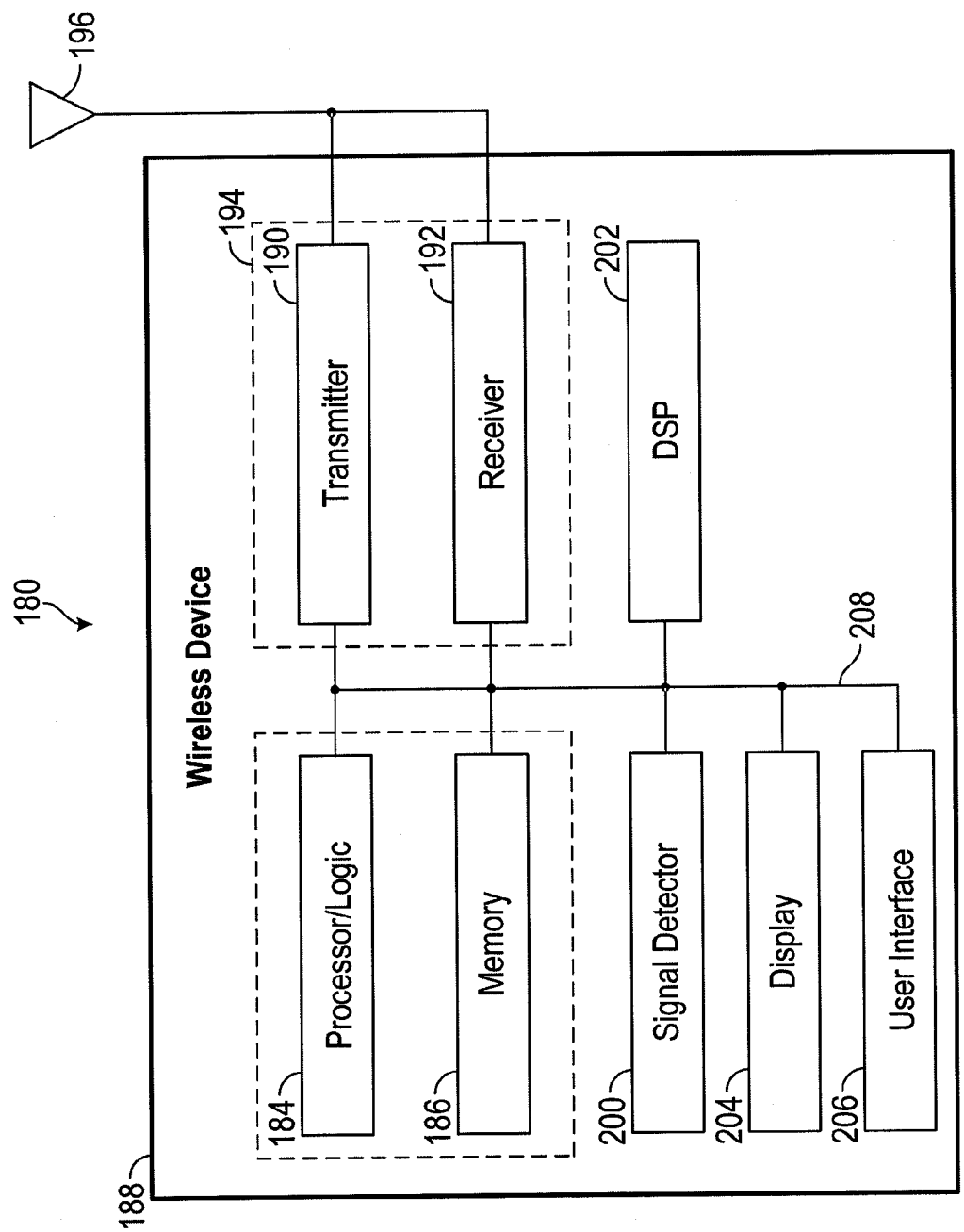
FIG. 9 is a block diagram of one implementation of a source device or a sink device.

FIG. 9 illustrates various components that may be utilized in a wireless device 180 that may be employed within the wireless communication system described above. The wireless device 180 is an example of a device that may be configured to implement the various methods described herein.

The wireless device 180 may include a processor 184 which controls operation of the wireless device 180. The processor 184 may also be referred to as a central processing unit (CPU). Memory 186, which may include both read-only memory (ROM) and random access memory (RAM), provides instructions and data to the processor 184. A portion of the memory 186 may also include non-volatile random access memory (NVRAM). The processor 184 typically performs logical and arithmetic operations based on program instructions stored within the memory 186. The instructions in the memory 186 may be executable to implement the methods described herein. For example, depending on whether the device is a source 30, sink 32, or both, the blocks of FIGS. 1, 2, and 3 may be implemented with the processor 184 and memory 186. The processor 184 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 180 may also include a housing 188 that may include a transmitter 190 and a receiver 192 to allow transmission and reception of data between the wireless device 180 and a remote location. The transmitter 190 and receiver 192 may be combined into a transceiver 194. An antenna 196 may be provided and electrically coupled to the transceiver 194. The wireless device 180 may also include (not shown) multiple transmitters, multiple receivers, multiple transceivers, and/or multiple antennas.

The wireless device 180 may also include a signal detector 200 that may be used in an effort to detect and quantify the level of signals received by the transceiver 194. The signal detector 200 may detect such signals as total energy, energy per subcarrier per symbol, power spectral density and other signals. The wireless device 180 may also include a digital signal processor (DSP) 202 for use in processing signals. The DSP 202 may be configured to generate a data unit for transmission. The wireless device 180 may further comprise a display 204, and a user interface 206. The user interface 206 may include a touchscreen, keypad, a microphone, and/or a speaker. The user interface 206 may include any element or component that conveys information to a user of the wireless device 180 and/or receives input from the user.

The various components of the wireless device 180 may be coupled together by one or more bus systems 208. The bus systems 208 may include a data bus, for example, as well as a power bus, a control signal bus, and a status signal bus in addition to the data bus. Those of skill in the art will appreciate the components of the wireless device 180 may be coupled together or accept or provide inputs to each other using some other mechanism.

Although a number of separate components are illustrated in FIG. 9, one or more of the components may be combined or commonly implemented. For example, the processor 184 may be used to implement not only the functionality described above with respect to the processor 185, but also to implement the functionality described above with respect to the signal detector 200 and/or the DSP 202. Further, each of the components illustrated in FIG. 9 may be implemented using a plurality of separate elements. Furthermore, the processor 184 may be used to implement any of the components, modules, circuits, or the like described below, or each may be implemented using a plurality of separate elements.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of displaying display content that is wirelessly received from a source device without passing through an intermediary device, comprising:
   wirelessly receiving a first set of display data packets for a first overlay portion of an image frame encoded utilizing a first video compression format directly from the source device;
   wirelessly receiving at least a second set of display data packets for a second overlay portion of the image frame encoded utilizing a second video compression format directly from the source device;
   wirelessly receiving overlay blending information directly from the source device, the overlay blending information indicating, for each overlay portion, at least one of: width, height, color key and blending equation;
   extracting at least the first overlay portion of the image frame from the first set of display data packets and the second overlay portion of the image frame from the second set of display data packets, wherein the extracting comprises separating at least the first set of display data packets and the second set of display packets from a single data transport stream;
   and blending at least the first overlay portion and the second overlay portion for display based at least in part on the overlay blending information received from the source device.

2. The method of claim 1, wherein the overlay blending information is incorporated into the single data transport stream.

3. The method of claim 1, wherein the single data transport stream is an MPEG2 transport stream, and wherein the blending information is provided in one or more PES header fields of the MPEG2 transport stream.

4. The method of claim 1, wherein the extracting comprises decoding at least the first set of display data packets and the second set of display data packets.

5. The method of claim 4, wherein at least one of a decoding algorithm utilized to decode the first set of data packets and a decoding algorithm utilized to decode the second set of data packets is a lossless decoding algorithm.

6. The method of claim 1, comprising transmitting a pause request and a play request comprising a presentation start time to the source device.

7. The method of claim 1, comprising wirelessly transmitting decoder capability information to the source device.

8. The method of claim 7, comprising transitioning to wirelessly receiving display data in a pre-encoded format as generated by a media player program of the source device when the decoder capability information indicates a capability to decode the pre-encoded format.

9. A method of wirelessly transmitting display content to a sink device without passing the display content through an intermediary device, comprising:
   encoding a first set of display data packets for a first overlay portion of an image frame utilizing a first video compression format;
   encoding at least a second set of display data packets for a second overlay portion of the image frame utilizing a second video compression format;
   generating overlay blending information associated with at least the first overlay portion and the second overlay portion, the overlay blending information indicating, for each overlay portion, at least one of: width, height, color key and blending equation;
   and wirelessly transmitting at least the first set of display data packets, the second set of display data packets, and the overlay blending information directly to the sink device utilizing a single data transport stream.

10. The method of claim 9, wherein the single data transport stream is an MPEG2 transport stream, and wherein the blending information is transmitted in one or more PES header fields of the MPEG2 transport stream.

11. The method of claim 9, wherein at least one of an encoding algorithm utilized to encode the first set of display data packets and an encoding algorithm utilized to encode the second set of display data packets is a lossless encoding algorithm.

12. The method of claim 9, wherein the first overlay portion and the second overlay portion are generated by different programs running on the source device.

13. The method of claim 12, wherein the different programs include at least one of an application program and an operating system.

14. The method of claim 12, wherein at least one of the different programs is a media player.

15. The method of claim 9, comprising receiving an indication of a TCP port or a UDP port for wirelessly transmitting at least the first set of display data packets, the second set of display data packets, and the overlay blending information to the sink device.

16. The method of claim 9, comprising receiving a pause request and a play request comprising a presentation start time from the sink device, and subsequently playing the media content from the requested presentation start time.

17. The method of claim 9, comprising:
sending a query to the sink device; and
receiving a response comprising information regarding a decoding capability of at least a first decoder and a second decoder of the sink device.

18. The method of claim 17, comprising transitioning to wirelessly transmitting display data to the sink device in a pre-encoded format as received from a media player program when the information indicates a capability of at least one of the at least first decoder and the second decoder to decode the pre-encoded format.

19. A display data sink device comprising:
a display;
a plurality of video decoders;
processing circuitry configured to:
wirelessly receive a first set of display data packets for a first overlay portion of an image frame encoded utilizing a first video compression format directly from a source device;
wirelessly receive at least a second set of display data packets for a second overlay portion of the image frame encoded utilizing a second video compression format directly from the source device;
wirelessly receive overlay blending information from the source device, the overlay blending information indicating, for each overlay portion, at least one of: width, height, color key and blending equation;
separate at least the first set of display data packets and the second set of display data packets from a single data transport stream;
extract at least the first overlay portion of the image frame from the first set of display data packets and the second overlay portion of the image frame from the second set of display data packets;
blend at least the first overlay portion and the second overlay portion for display based at least in part on the overlay blending information received from the source device; and present the image frame on the display.

20. The device of claim 19, wherein the processing circuitry is configured to extract the overlay blending information from the single data transport stream.

21. The device of claim 20, wherein the single data transport stream is an MPEG2 transport stream and the processing circuitry is configured to extract the overlay blending information from one or more PES header fields of the MPEG2 transport stream.

22. The device of claim 19, wherein the processing circuitry is configured to decode the first set of display data packets utilizing a different one of the plurality of video decoders than is utilized to decode the second set of display data packets.

23. The device of claim 19, wherein at least one of the plurality of video decoders utilizes a lossless decoding algorithm.

24. The device of claim 19, wherein the processing circuitry is configured to send a pause command and a presentation time to the source device.

25. The device of claim 19, wherein the processing circuitry is configured to wirelessly transmit information regarding decoding capability of the plurality of video decoders to the source device.

26. The device of claim 25, wherein the processing circuitry is configured to transition to wirelessly receiving display data in a pre-encoded format as generated by a media player program of the source device when the decoder capability information indicates a capability of at least one of the plurality of video decoders to decode the pre-encoded format.

27. A display data source device comprising:
a display;
a plurality of video encoders;
at least one media player program;
processing circuitry configured to:
encode a first set of display data packets for a first overlay portion of an image frame utilizing a first video compression format;
encode at least a second set of display data packets for a second overlay portion of the image frame utilizing a second video compression format;
generate overlay blending information associated with at least the first overlay portion and the second overlay portion, the overlay blending information indicating, for each overlay portion, at least one of: width, height, color key and blending equation;
and wirelessly transmit at least the first set of display data packets, the second set of display data packets, and the overlay blending information in a single data transport stream directly to a sink device.

28. The device of claim 27, wherein the single data transport stream is an MPEG2 transport stream, and wherein the processing circuitry is configured to transmit the blending information in one or more PES header fields of the MPEG2 transport stream.

29. The device of claim 27, wherein at least one of the plurality of video encoders utilizes a lossless encoding algorithm.

30. The device of claim 27, wherein the first overlay portion and the second overlay portion are generated by different programs running on the source device.

31. The device of claim 30, wherein the different programs include at least one of an application program and an operating system.

32. The device of claim 27, wherein the processing circuitry is configured to receive an indication of a TCP port or a UDP port for wirelessly transmitting at least the first set of display data packets, the second set of display data packets, and the overlay blending information to the sink device.

33. The device of claim 27, wherein the processing circuitry is configured to receive a pause request and a presentation start time from the sink device.

34. The device of claim 27, wherein the processing circuitry is configured to send a query to the sink device and receive a response comprising information regarding a decoding capability of the plurality of decoders of the sink device.

35. The device of claim 34, wherein the processing circuitry is configured to transition to wirelessly transmitting display data to the sink device in a pre-encoded format as received from the media player program when the information indicates a capability of at least one of the plurality of decoders to decode the pre-encoded format.

36. A system for wirelessly transmitting display data from a source device to a sink device without passing the display data through an intermediary device, the system comprising:
- a source device having a display and wireless transmission and receiving circuitry;
- a sink device having a display and wireless transmission and receiving circuitry;
- wherein the source device and the sink device are configured to negotiate display transmission and receiving parameters to allow:
- a first mode where display data is retrieved from a display frame buffer of the source device, encoded for wireless transmission, wirelessly transmitted to the sink device, decoded on the sink device, and presented on the display of the sink device; and
- a second mode where:
- at least a first overlay portion of an image frame is encoded utilizing a first video compression format and a second overlay portion of the image frame is encoded utilizing a second video compression format at the source device;
- and at least the first overlay portion and the second overlay portion are wirelessly transmitted to the sink device in a single data transport stream, separately decoded on the sink device, blended on the sink device based at least in part on overlay blending information received from the source device,
- and presented on the display of the sink device, the overlay blending information indicating, for each overlay portion, at least one of: width, height, color key and blending equation.

* * * * *